United States Patent
Long

(10) Patent No.: US 8,516,998 B2
(45) Date of Patent: Aug. 27, 2013

(54) PROPANE INJECTION CONTROL FOR GASOLINE AND GASEOUS FUEL INTERNAL COMBUSTION ENGINES

(76) Inventor: Keith Long, Utica, MI (US)

( * ) Notice: Subject to any disclaimer, the term of this patent is extended or adjusted under 35 U.S.C. 154(b) by 1056 days.

(21) Appl. No.: 12/462,664

(22) Filed: Aug. 6, 2009

(65) Prior Publication Data

US 2010/0031925 A1 Feb. 11, 2010

Related U.S. Application Data

(60) Provisional application No. 61/188,108, filed on Aug. 6, 2008.

(51) Int. Cl.
*F02B 43/12* (2006.01)

(52) U.S. Cl.
USPC .......................................................... 123/527

(58) Field of Classification Search
USPC .......................................... 123/525–527, 463
See application file for complete search history.

(56) References Cited

U.S. PATENT DOCUMENTS

| | | | | |
|---|---|---|---|---|
| 4,227,497 A | * | 10/1980 | Mathieson | 123/525 |
| 4,953,515 A | | 9/1990 | Fehr et al. | |
| 5,027,758 A | * | 7/1991 | Siegler | 123/527 |
| 5,076,245 A | * | 12/1991 | Jones | 123/527 |
| 5,105,791 A | * | 4/1992 | Nye, Jr. | 123/527 |
| 5,330,031 A | | 7/1994 | Hill et al. | |
| 5,408,957 A | | 4/1995 | Crowley | |
| 5,483,943 A | * | 1/1996 | Peters | 123/527 |
| 5,816,224 A | | 10/1998 | Welsh et al. | |
| 5,904,130 A | * | 5/1999 | Romanelli | 123/527 |
| 6,026,787 A | * | 2/2000 | Sun et al. | 123/525 |
| 6,422,015 B2 | * | 7/2002 | Long | 123/526 |
| 6,591,817 B2 | | 7/2003 | Deutsch | |
| 6,901,889 B1 | | 6/2005 | Ritter et al. | |
| 6,976,455 B2 | | 12/2005 | Mey et al. | |
| 7,017,559 B2 | | 3/2006 | Mey et al. | |
| 7,387,091 B2 | | 6/2008 | Ritter | |
| 7,870,849 B2 | * | 1/2011 | Ceratto | 123/527 |
| 2003/0106538 A1 | * | 6/2003 | Benson | 123/527 |

* cited by examiner

*Primary Examiner* — Stephen K Cronin
*Assistant Examiner* — Arnold Castro
(74) *Attorney, Agent, or Firm* — John R. Benefiel

(57) ABSTRACT

A system and method for metering the injection of propane gas into the air intake of a gasoline or gaseous fuel spark ignition internal combustion engine by subjecting a metering valve member to intake manifold vacuum so as to decrease propane injection with increasing engine vacuum which counters a substantially constant biasing spring force acting to thereon tending to increase the propane injected into the engine air intake.

9 Claims, 3 Drawing Sheets

PROPANE INJECTION CONTROL FOR GASOLINE AND GASEOUS FUEL INTERNAL COMBUSTION ENGINES

CROSS REFERENCE TO RELATED APPLICATIONS

This application claims the benefit of U.S. provisional application Ser. No. 61/188,108 filed on Aug. 6, 2008.

BACKGROUND OF THE INVENTION

This invention concerns injection of propane gas into internal combustions engines It is known to inject propane into diesel engines to increase power.

It is also known to use propane or other gaseous fuels as the sole fuel in an internal combustion engine.

In the present inventor's prior patent U.S. Pat. No. 6,422,015, boost pressure levels are used to control injection of propane into a diesel engine and this has proven to be highly successful in improving diesel engine performance.

It is also known to inject propane into a gasoline engine at a constant flow rate as described in U.S. Pat. Nos. 5,408,957 and 5,816,224 but this does not fully realize the potential improvement to fuel economy which can be achieved by propane injection.

In a propane fueled engine it is known to use a drop in pressure in a pitot tube connected to the air intake to control the flow of propane injected into the engine. This mode of control of propane injection results in a sluggish response to the throttle valve operation.

It is the object of the present invention to provide a control for propane injection into gasoline and gaseous fuel spark ignition internal combustion engines which improves engine performance while being relatively simple and trouble free.

SUMMARY OF THE INVENTION

These and other objects of the present invention are achieved by controlling the flow of propane injected into a spark ignition internal combustion engine by a metering control valve which has a valve member spring urged towards a fully open position, with engine vacuum communicated to the control valve member so as to create a counteracting force tending to overcome the spring bias and urge the metering control valve member towards a closed position. Accordingly, at maximum vacuum under engine idle conditions, all propane injection ceases. As the manifold vacuum decreases with increased throttle valve opening, propane injection flow increases as the spring opens the metering control valve member to an increased extent.

In gasoline fueled engines as propane injection increases, existing engine controls which maintain charge richness automatically decrease the amount of gasoline fuel injected to offset the amount of propane injected and thus maintain a proper air/fuel mixture for engine operating conditions.

Responsiveness of gas fueled engines are thereby greatly increased.

In the gasoline fueled engines mileage is significantly improved.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
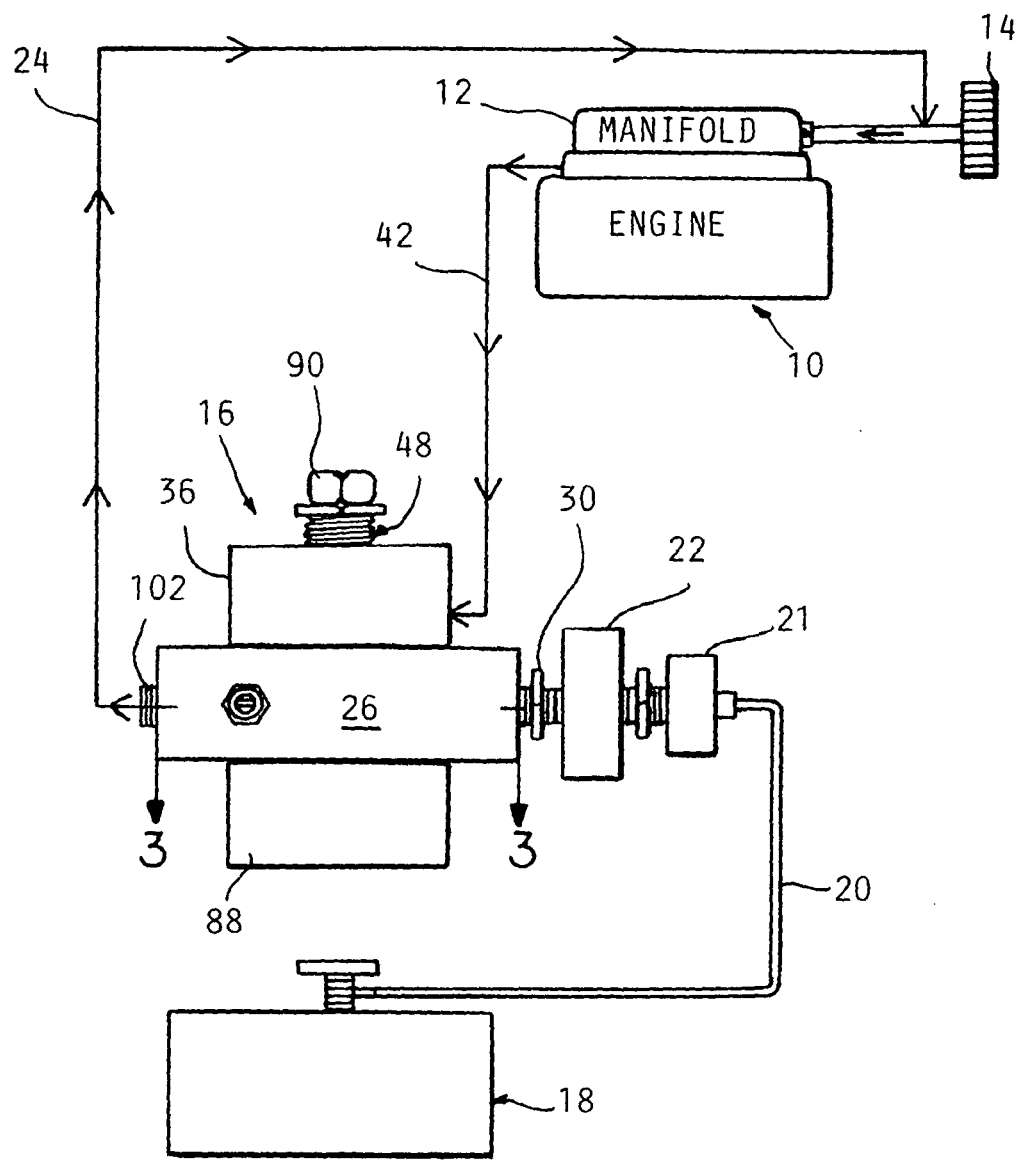
FIG. 1 is a diagram of a propane injection control system associated with a spark ignition i.e., Otto cycle internal combustion engine, which may be fueled with gasoline or a gaseous fuel.

Referring to FIG. 1, an Otto cycle or spark ignition internal combustion engine 10 is represented diagrammatically, utilizing either gasoline or a gaseous fuel such as propane, which engine includes an intake manifold 12 receiving air from an air filter/intake 14.

A metering control valve 16 is interposed between a propane storage tank 18 and line 24 to the air intake 14 which controls the rate of injection of gaseous propane into the air intake 14 via line 24. A pressure regulator 22 is provided upstream of the metering control valve 16 in the line 20 between the tank 18 and metering control valve 16 to set the propane pressure to a constant level (approximately 10 psi) in the well known manner.

A propane shut off valve 21 is operated by the engine ignition (not shown) which allows propane flow to the metering control valve 16 only when the engine ignition is turned on.

Figure 2:
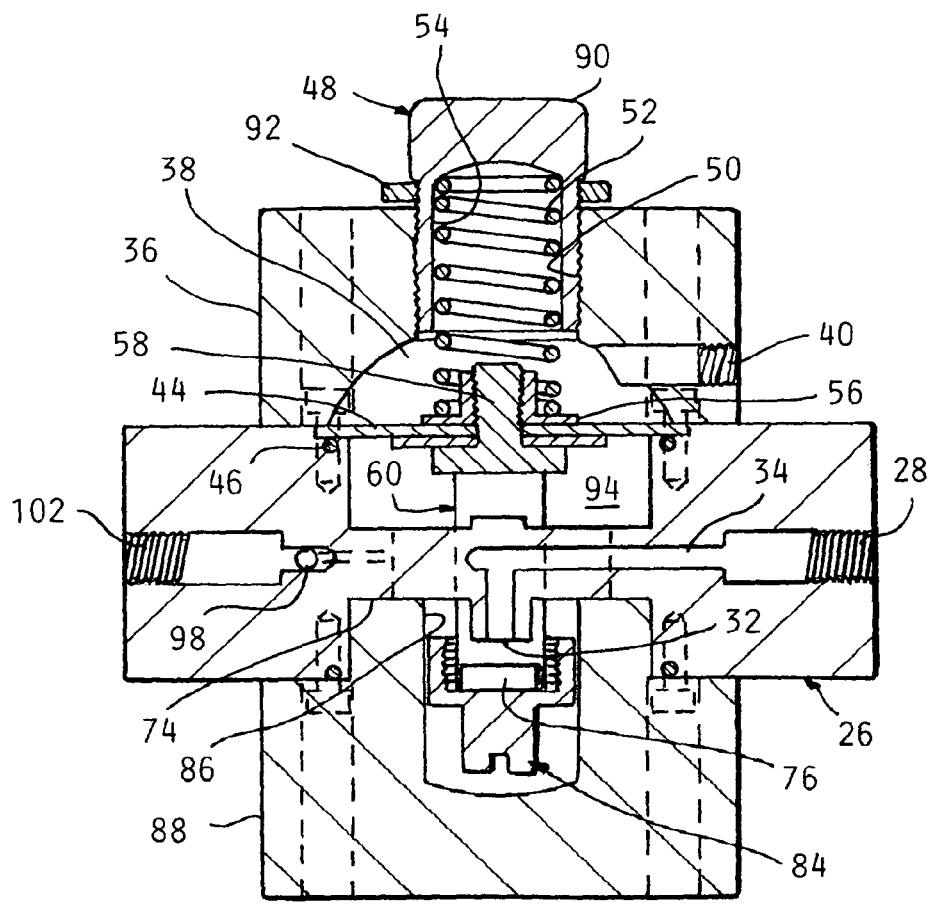
FIG. 2 is an enlarged vertical cross-sectional view of a metering control valve included in the system of FIG. 1.
Figure 4:
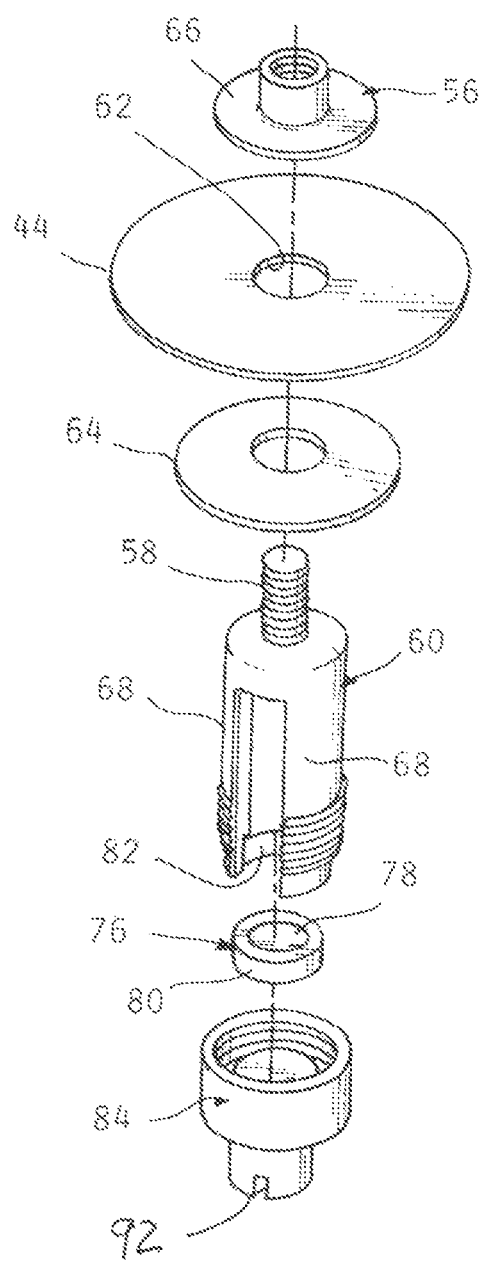
FIG. 4 is an exploded pictorial view of some components of the metering control valve shown in FIGS. 1-3.

The metering control valve 16 preferably has a movable valve member comprised of a diaphragm 44 (FIGS. 2, 4) which has to engine manifold vacuum and a spring force applied to one side causing it to move so as to control the flow of propane into the engine air intake 14, i.e., to increase that flow with increasing levels of intake manifold vacuum.

The metering control valve 16 includes a central housing piece 26 having an inlet port 28 threaded to receive a fitting 30 for connection to the regulator 22. The inlet port 28 is connected to a passage 34 that directs the flow of propane gas to a valve port 32.

An upper housing piece 36 attached with screws as shown to the central housing piece 26 has an internal cavity 38 to which engine manifold vacuum is communicated via port 40 and line 42.

The diaphragm 44 covers the cavity 38 and is sealed against the central housing 26 with an O-ring 46.

A threaded spring pressure adjusting plug 48 is received in a threaded bore 50 entering into cavity 38 and has a compression spring 52 received in an internal bore 54. The spring force controls the point at which propane injection is initiated, and is adjustable by advancing or retracting the plug 48 in the bore 54.

The spring 52 engages a plate 56 which is attached to the diaphragm 44 by being threaded to a plug end 58 of a forked plunger 60 which protrudes through a central hole 62 in the diaphragm.

A dished washer 64 and flange 66 clamps the diaphragm 44 therebetween and causes the forked plunger 60 to move with motion of the center of the diaphragm 44.

The forked plunger 60 has two tines 68 which straddle a bridge portion 70 of the central housing 26 lying between two openings 72 in a central web 74 in which the passage 34 is formed. This straddling allows up and down movement of the plunger 60.

The valve port 32 is formed in a downward extending protrusion integral with the bridging portion 70.

A plunger guide 84 is threaded over the lower ends of the tines 68 and is slidably fit into a bore 86 in a lower housing piece 88 attached to the central housing piece 26 with screws as shown.

A slotted end 92 allows use of a screw driver to tighten the plunger guide 84 and adjust the position of the valve seat 86 relative the valve port 32 in the various positions of the plunger 60.

The force of the spring 52 acting on the diaphragm 44 can be adjusted as noted above by advancing the plug 48 by engagement of a wrench with a hex head 90 on the plug 48. Securement in any adjusted position is achieved by advance of a threaded locking nut 92 to be tightened against the top of the second lower housing piece 88.

Figure 3:
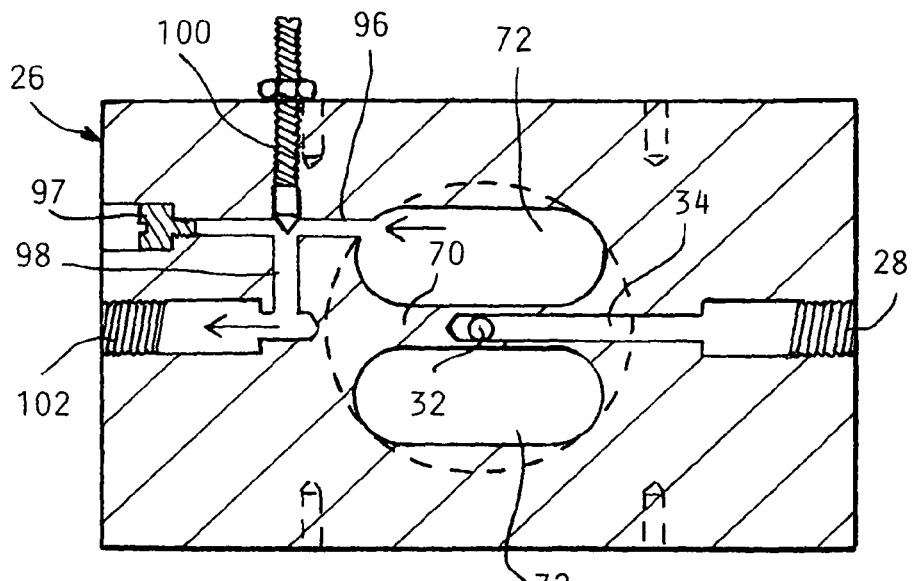
FIG. 3 is an enlarged cross-sectional view of the metering control valve in FIG. 1 taken along the line 3-3.

The propane gas admitted through the valve port 32 flows into the space 94 in the central housing piece 26 including the web openings 72. An outlet passage 96 (FIG. 3), plugged with a screw 97, exits from one of the web openings 72 and thence to a cross passage 98, with an adjustable needle screw 100 controlling the degree of restriction of propane gas flow to an outlet port 102.

The space 94 below the diaphragm 44 will contain gaseous propane during engine operation but it is substantially at atmospheric pressure since communicating with the engine air inlet 14.

Diaphragm 44 has the helical compression spring 52 engaged therewith acting to push the plunger 60 down, which unseats the valve seat 76 from valve port 32, increasing the outflow of gaseous propane.

Manifold vacuum in cavity 38 being below atmospheric pressure causes the substantially atmospheric pressure in space 94 to tend to move the diaphragm 44 and plunger 60 in a direction towards a more closed position, i.e., to push the plunger 60 up to increasingly restrict the valve port 32 to reduce or stop the flow of propane to the air intake 14 in correspondence with the degree of vacuum in the manifold 12.

A valve seat 76 having a resilient sealing disc 78 held in a small metal ring 80 is snap fit into a receiving opening 82 defined between the lower end of the tines 68.

This locates the disc 78 aligned with and below the valve port 32.

Thus, as engine vacuum increases with lower engine speed and more closed throttle positions, an increasing differential pressure force is exerted on the diaphragm 44 by the substantially atmospheric pressure existing in space 94, counteracting the spring force and raising the plunger 60 against the downward directed force of the spring 52. This correspondingly reduces the flow of propane into the engine air intake 14. The adjusted spring pressure set controls the point at which injection begins and ends.

At higher engine speeds with more open throttle positions, the plunger 60 is moved in a downward direction, and the valve port 32 is correspondingly more opened to the space 94 by the lowering of the plunger 60, which increases the flow of propane gas injected into the engine.

This arrangement has proven to increase the responsiveness and overall performance of such engines.

In gasoline engines, the injection of gasoline is automatically reduced by the existing engine fuel controls as the flow of propane increases to maintain a proper mixture and overall fuel economy has been found to increase due to more efficient combustion.

The metering control system according to the invention is simple and reliable in operation, and produces improved mileage and performance of the internal combustion spark ignition engines with which it is used.

The invention claimed is:

1. A propane injection control system in combination with an Otto cycle internal combustion engine having an air intake and an intake manifold comprising:
   a storage tank containing gaseous propane;
   a fluid connection between said air intake and said propane tank;
   an injection control including a metering control valve interposed in said fluid connection and including a manhole valve member subjected to a substantially constant force tending to move said valve member in a direction which increases the flow of propane gas into said air inlet, said valve member also subjected to a countering force generated by communication of said engine intake manifold vacuum to said valve member to urge said valve member to move in a direction which correspondingly reduces the flow of propane gas into said air intake to a degree corresponding to increased levels of manifold vacuum, whereby a variable injection of propane gas into said air intake in correspondence to the level of engine vacuum is produced.

2. The system according to claim 1 wherein said metering control valve has a housing formed with an internal space and a diaphragm comprising said valve member mounted in said housing extending across said space and acted on by a spring exerting a substantially constant force on said diaphragm, said diaphragm connected to a valve element, said spring urging said diaphragm and valve element to move to uncover a valve port in said housing connected to said propane tank thereby controlling the flow of propane to said engine intake manifold.

3. The system according to claim 2 wherein said intake manifold vacuum acts on the same side of said diaphragm as said spring with a higher pressure substantially equal to atmospheric pressure exerted on an opposite side of said diaphragm to create a differential pressure force on said diaphragm counteracting said spring and tending to move said valve to positions restricting said valve port to a greater degree.

4. The system according to claim 3 wherein said diaphragm has a plunger connected at one end thereto with said valve element carried by said plunger to move said valve element with movement of said diaphragm.

5. The system according to claim 4 wherein said valve port is formed in a bridge portion extending across said space in said housing on one side of said diaphragm, a flow passage extending within said bridge portion and exiting through said valve port at an intermediate location, said plunger being forked and straddling said bridge portion with a valve seat comprising said valve element mounted in another end thereof between tines of said forked plunger.

6. The system according to claim 2 further including an adjustment member engaging said spring which is threaded into a bore in said housing to enable adjustment of the spring pressure acting on said diaphragm.

7. A method of metering the injection of propane into the air intake of an internal combustion spark ignition engine fueled with gasoline or gaseous fuel and having an intake manifold, said method comprising:

connecting a source of propane under substantially constant pressure to said air intake;

metering the flow of propane gas into said air intake with an interposed metering control valve having a valve member subjected to a substantially constant bias force tending to move the valve member in one direction so as to increase the flow of propane gas into said air intake and a counteracting force corresponding to the level of vacuum in said intake manifold, tending to move the valve member in an opposite direction tending to decrease the flow of propane gas correspondingly to the vacuum exerted thereon whereby the flow of propane into said air intake is reduced with increasing levels of intake manifold vacuum.

8. The method according to claim 7 including mounting a spring so as to urge movement of said metering valve member so as to increase propane flow.

9. A propane injection control system in combination with an Otto cycle internal combustion engine having an air intake and an intake manifold comprising:

a storage tank containing gaseous propane;

a fluid connection between said air intake and said propane tank; an injection control including a metering control valve interposed in said fluid connection and including a manhole valve member subjected to a substantially constant force tending to move said valve member in a direction which increases the flow of propane gas into said air inlet, said valve member also subjected to a countering force generated by communication of said engine intake manifold vacuum to said valve member to urge said valve member to move in a direction which correspondingly reduces the flow of propane gas into said air intake to a degree corresponding to increased levels of manifold vacuum, whereby a variable injection of propane gas into said air intake in correspondence to the level of engine vacuum is produced;

said metering control valve having a housing formed with an internal space and a diaphragm comprising said valve member mounted in said housing extending across said space and acted on by a spring exerting a substantially constant force on said diaphragm, said diaphragm connected to a valve element, said spring urging said diaphragm and valve element to move to uncover a valve port in said housing connected to said propane tank thereby controlling the flow of propane to said engine intake manifold;

said intake manifold vacuum acting on the same side of said diaphragm as said spring with a higher pressure substantially equal to atmospheric pressure exerted on an opposite side of said diaphragm to create a differential pressure force on said diaphragm counteracting said spring and tending to move said valve to positions restricting said valve port to a greater degree;

said diaphragm having a plunger connected at one end thereto with said valve element carried by said plunger to move said valve element with movement of said diaphragm; and said valve port is formed in a bridge portion extending across said space in said housing on one side of said diaphragm, a flow passage extending within said bridge portion and exiting through said valve port at an intermediate location, said plunger being forked and straddling said bridge portion with a valve seat comprising said valve element mounted in another end thereof between tines of said forked plunger.

\* \* \* \* \*